US008392093B2

(12) United States Patent
Dingl et al.

(10) Patent No.: US 8,392,093 B2
(45) Date of Patent: Mar. 5, 2013

(54) METHOD AND DEVICE FOR OPERATING AN INTERNAL COMBUSTION ENGINE

(75) Inventors: Jürgen Dingl, Regensburg (DE); Gerhard Eser, Hemau (DE)

(73) Assignee: Continental Automotive GmbH, Hannover (DE)

( * ) Notice: Subject to any disclaimer, the term of this patent is extended or adjusted under 35 U.S.C. 154(b) by 172 days.

(21) Appl. No.: 12/919,109

(22) PCT Filed: Feb. 3, 2009

(86) PCT No.: PCT/EP2009/051197

§ 371 (c)(1), (2), (4) Date: Aug. 24, 2010

(87) PCT Pub. No.: WO2009/109439

PCT Pub. Date: Sep. 11, 2009

(65) Prior Publication Data

US 2011/0004394 A1 Jan. 6, 2011

(30) Foreign Application Priority Data

Mar. 4, 2008 (DE) ......................... 10 2008 012 459

(51) Int. Cl.
*F02D 41/22* (2006.01)

(52) U.S. Cl. ..................... 701/102; 701/107; 123/90.17; 73/114.31

(58) Field of Classification Search .................. 701/102, 701/107; 123/90.17, 90.27, 90.31; 73/114.31, 73/114.32, 114.33, 114.34, 114.35, 114.37, 73/114.79

See application file for complete search history.

(56) References Cited

U.S. PATENT DOCUMENTS

| | | | | |
|---|---|---|---|---|
| 5,549,080 | A | 8/1996 | Uchikawa | 123/90.16 |
| 5,621,644 | A * | 4/1997 | Carson et al. | 701/102 |
| 5,974,870 | A | 11/1999 | Treinies et al. | 73/118.2 |
| 5,979,378 | A | 11/1999 | Matsuno et al. | 123/90.15 |
| 6,213,068 | B1 | 4/2001 | Hassdenteufel | 123/90.15 |

(Continued)

FOREIGN PATENT DOCUMENTS

| | | | |
|---|---|---|---|
| DE | 19357183 | A1 | 6/2000 |
| DE | 10032332 | A1 | 1/2002 |

(Continued)

OTHER PUBLICATIONS

International Search Report and Written Opinion for Application No. PCT/EP2009/051197 (14 pages), May 4, 2009.

(Continued)

*Primary Examiner* — Hai Huynh
(74) *Attorney, Agent, or Firm* — King & Spalding L.L.P.

(57) ABSTRACT

A first camshaft misalignment value is determined from a measurement variable allocated to an engine air flow path. A second misalignment value is determined from a first operating variable outside of the air flow path. A trouble-free operation is identified when both values are smaller than a predefined first threshold. Misalignment is confirmed when one of both values is greater than the first and a difference between both values is smaller than a predefined second threshold. An air flow path fault is identified when the first value is greater and the second value is smaller than the first threshold and when the difference between both values is greater than the second threshold. A fault outside of the air flow path is identified, when the second value is greater and the first value is smaller than the first threshold and when the difference is greater than the second threshold.

18 Claims, 3 Drawing Sheets

U.S. PATENT DOCUMENTS

| | | | | |
|---|---|---|---|---|
| 6,457,353 | B1 | 10/2002 | Kanke et al. | 73/117.3 |
| 6,615,812 | B2 | 9/2003 | Wild et al. | 123/683 |
| 7,047,957 | B1 | 5/2006 | Smith et al. | 123/673 |
| 7,146,268 | B2 | 12/2006 | Wild et al. | 701/107 |
| 7,806,093 | B2 * | 10/2010 | Wright | 123/90.17 |
| 2006/0081217 | A1 | 4/2006 | Fuwa et al. | 123/350 |

FOREIGN PATENT DOCUMENTS

| | | | |
|---|---|---|---|
| DE | 10039785 | | 2/2002 |
| DE | 10158261 | | 6/2003 |
| DE | 10341583 | A1 | 4/2005 |
| DE | 102004033845 | | 2/2006 |
| DE | 102004039216 | | 4/2006 |
| WO | 9735106 | | 9/1997 |

OTHER PUBLICATIONS

International Search Report and Written Opinion for Application No. PCT/EP2009/051304 (12 pages), Jul. 1, 2009.

* cited by examiner

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2009/051197 filed Feb. 3, 2009, which designates the United States of America, and claims priority to German Application No. 10 2008 012 459.1 filed Mar. 4, 2008, the contents of which are hereby incorporated by reference in their entirety.

TECHNICAL FIELD

The invention relates to a method and a device for operating an internal combustion engine. In this case, a first value of a camshaft misalignment of a camshaft of the internal combustion engine is determined as a function of a measured variable. The measured variable is associated with an air path of the internal combustion engine.

BACKGROUND

In an internal combustion engine with a phase-adjusting device a phase between a reference mark on a camshaft of the internal combustion engine and a reference mark on a crankshaft of the internal combustion engine may be adjusted in a reference position of the crankshaft. The phase may be determined as a function of an operating variable of the internal combustion engine. Because of manufacturing tolerances and/or wear, in internal combustion engines of an identical type an actual phase may differ from the phase resulting from determination of the phase. This discrepancy may also be referred to as camshaft misalignment. At different operating points of the internal combustion engine values of the camshaft misalignment may be determined and adapted.

The camshaft misalignment may be determined using different methods. For example, the camshaft misalignment may be determined as a function of a measured variable that is associated with an air path of the internal combustion engine. In this case, for example all measured variables, the measured value of which is determined in an intake tract of the internal combustion engine, are associated with the air path. Alternatively, the camshaft misalignment may be determined by means of a measured variable that is associated with a fuel path of the internal combustion engine. The fuel path comprises for example all of the measured variables that are acquired in an exhaust tract of the internal combustion engine and all of the final controlling elements that contribute towards metering of the fuel. The camshaft misalignment may further be determined as a function of a value of an irregular running of the internal combustion engine and/or as a function of a measured variable that has an influence upon the irregular running and/or is associated with an ignition path of the internal combustion engine.

SUMMARY

According to various embodiments, a method and a device can be provided that enable easy identification of a fault of the internal combustion engine.

According to an embodiment, in a method of operating an internal combustion engine, a first value of a camshaft misalignment of a camshaft of the internal combustion engine is determined as a function of a measured variable, wherein the measured variable is associated with an air path of the internal combustion engine, a second value of the camshaft misalignment of the camshaft is determined as a function of a value of a first operating variable of the internal combustion engine outside of the air path, trouble-free operation of the internal combustion engine is identified if both values of the camshaft misalignment are lower than a defined first threshold value, the camshaft misalignment is confirmed if at least one of the two values of the camshaft misalignment is greater than the defined first threshold value and if a difference between the two values of the camshaft misalignment is lower than a defined second threshold value, a fault in the air path of the internal combustion engine is identified if the first value of the camshaft misalignment is greater and the second value of the camshaft misalignment is lower than the defined first threshold value and if the difference between the two values of the camshaft misalignment is greater than the defined second threshold value, and a fault outside of the air path of the internal combustion engine is identified if the second value of the camshaft misalignment is greater and the first value of the camshaft misalignment is lower than the defined first threshold value and if the difference between the two values of the camshaft misalignment is greater than the defined second threshold value.

According to a further embodiment, the value of the first operating variable may represent an actual value of a residual oxygen content of an exhaust gas of the internal combustion engine, and if the second value of the camshaft misalignment is greater and the first value of the camshaft misalignment is lower than the first threshold value and if the difference between the two values of the camshaft misalignment is greater than the defined second threshold value, a fault in the fuel path of the internal combustion engine may be identified. According to a further embodiment, the measured variable can be acquired during throttled operation of the internal combustion engine, and the actual value of the residual oxygen content can be determined during unthrottled operation of the internal combustion engine. According to a further embodiment, the value of the first operating variable may represent a value of an irregular running, and if the second value of the camshaft misalignment is greater and the first value of the camshaft misalignment is lower than the first threshold value and if the difference between the two values of the camshaft misalignment is greater than the defined second threshold value, a fault in a determination of the irregular running or a fault in an ignition path of the internal combustion engine may be identified. According to a further embodiment, the measured variable can be acquired during throttled operation of the internal combustion engine. According to a further embodiment, the value of the first operating variable may represent an actual value of a residual oxygen content of an exhaust gas of the internal combustion engine, a third value of the camshaft misalignment of the camshaft may be determined as a function of a value of an irregular running, trouble-free operation of the internal combustion engine can be identified if the three values of the camshaft misalignment are in each case lower than the defined first threshold value, the camshaft misalignment can be confirmed if at least one of the values of the camshaft misalignment is greater than the first threshold value and if a difference between the three values of the camshaft misalignment is lower than a defined second threshold value, a fault in the air path of the internal combustion engine can be identified if the first value of the camshaft misalignment is greater and the second and the third value of the camshaft misalignment are lower than the defined first threshold value and if the difference between the three values of the camshaft misalignment is greater than the defined second threshold value, a fault in a fuel path of the internal combustion engine can be identified if the second value of the camshaft misalignment is greater and the first and the third value of the camshaft misalignment are lower than the defined first threshold value and if the difference between the three values of the camshaft misalignment is greater than the defined second threshold value, and a fault in a determination of the irregular running or a fault in an ignition path of the internal combustion engine can be identified if the third value of the camshaft misalignment is greater and the first and the second value of the camshaft misalignment are lower than the defined first threshold value and if the difference between the three values of the camshaft misalignment is greater than the defined second threshold value. According to a further embodiment, the measured variable can be acquired during unthrottled operation of the internal combustion engine, and the actual value of the residual oxygen content can be determined during throttled operation of the internal combustion engine.

According to another embodiment, a device for operating an internal combustion engine, can be configured: to determine a first value of a camshaft misalignment of a camshaft of the internal combustion engine as a function of a measured variable, wherein the measured variable is associated with an air path of the internal combustion engine, to determine a second value of the camshaft misalignment of the camshaft as a function of a value of a first operating variable of the internal combustion engine outside of the air path, to identify trouble-free operation of the internal combustion engine if both values of the camshaft misalignment are lower than a defined first threshold value, to confirm the camshaft misalignment if at least one of the two values of the camshaft misalignment is greater than the first threshold value and if a difference between the two values of the camshaft misalignment is lower than a defined second threshold value, to identify a fault in the air path of the internal combustion engine if the first value of the camshaft misalignment is greater and the second value of the camshaft misalignment is lower than the defined first threshold value and if the difference between the two values of the camshaft misalignment is greater than the defined second threshold value, to identify a fault outside of the air path of the internal combustion engine if the second value of the camshaft misalignment is greater and the first value of the camshaft misalignment is lower than the defined first threshold value and if the difference between the two values of the camshaft misalignment is greater than the defined second threshold value.

BRIEF DESCRIPTION OF THE DRAWINGS

There now follows a description of embodiments with reference to diagrammatic drawings.

In all of the figures elements of an identical construction or function are denoted by the same reference characters.

DETAILED DESCRIPTION

Figure 1:
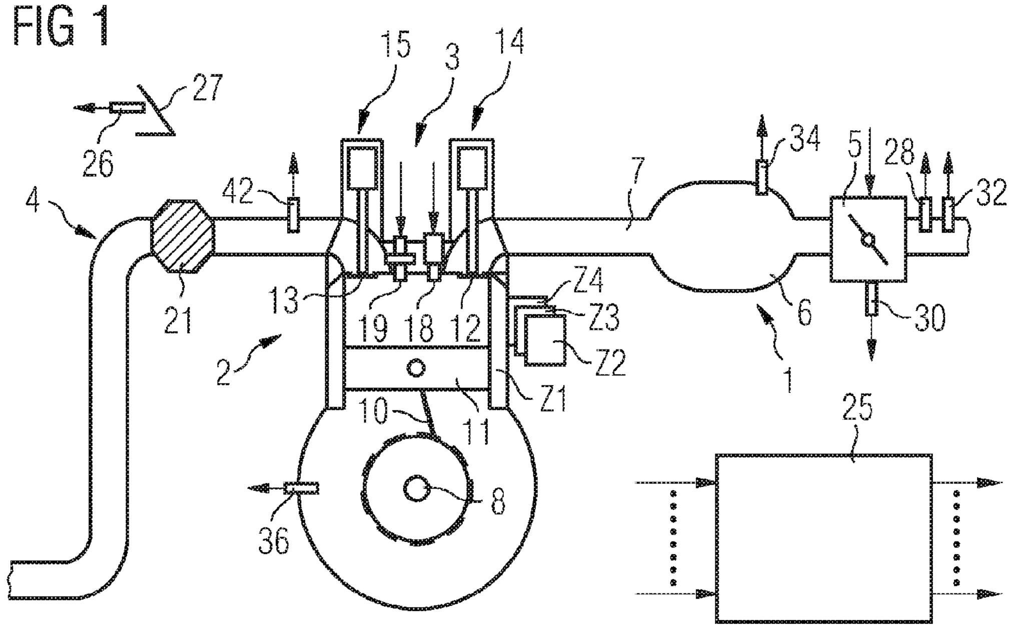
FIG. 1 an internal combustion engine.

According to various embodiments, in a method and a device for operating an internal combustion engine, a first value of a camshaft misalignment of a camshaft of the internal combustion engine is determined as a function of a measured variable. The measured variable is associated with an air path of the internal combustion engine. A second value of the camshaft misalignment of the camshaft is determined as a function of a value of a first operating variable of the internal combustion engine outside of the air path. Trouble-free operation of the internal combustion engine is identified if both values of the camshaft misalignment are lower than a defined first threshold value. The camshaft misalignment is confirmed if at least one of the two values of the camshaft misalignment is greater than the first threshold value and if a difference between the two values of the camshaft misalignment is lower than a defined second threshold value. A fault in the air path of the internal combustion engine is identified if the first value of the camshaft misalignment is greater and the second value of the camshaft misalignment is lower than the defined first threshold value and if the difference between the two values of the camshaft misalignment is greater than the defined second threshold value. A fault outside of the air path of the internal combustion engine is identified if the second value of the camshaft misalignment is greater and the first value of the camshaft misalignment is lower than the defined first threshold value and if the difference between the two values of the camshaft misalignment is greater than the defined second threshold value.

This easily enables identification of the fault in the air path of the internal combustion engine or outside of the air path of the internal combustion engine. The air path comprises all of the final controlling elements of an intake tract of the internal combustion engine, all of the measured variables acquired in the intake tract, and the corresponding sensors for acquiring the measured values and operating variables derived therefrom. The air path further comprises all of the characteristic maps or models, in particular an intake manifold model, on the basis of which as a function of one of the measured variables of the air path model values of operating variables in the air path are determined.

According to a further embodiment, the value of the first operating variable represents an actual value of a residual oxygen content of an exhaust gas of the internal combustion engine. If the second value of the camshaft misalignment is greater and the first value of the camshaft misalignment is lower than the first threshold value and if the difference between the two values of the camshaft misalignment is greater than the defined second threshold value, a fault in the fuel path of the internal combustion engine is identified. This easily enables identification of the fault in the fuel path of the internal combustion engine. The fuel path comprises all of the final controlling elements that contribute towards injection of the fuel and/or are disposed in an exhaust tract of the internal combustion engine and all of the measured variables that are acquired in the exhaust tract, the corresponding sensors for acquiring these measured variables and operating variables derived therefrom.

According to a further embodiment, the measured variable associated with the air path is acquired during throttled operation of the internal combustion engine. The actual value of the residual oxygen content is determined during unthrottled operation of the internal combustion engine. This may contribute towards a particularly precise determination of the first and/or second value of the camshaft misalignment, since determining the first value of the camshaft misalignment as a function of the measured variable in the air path during throttled operation is particularly precise and since determining the second value of the camshaft misalignment as a function of the actual value of the residual oxygen content during unthrottled operation of the internal combustion engine is particularly precise.

According to a further embodiment, the value of the first operating variable represents a value of an irregular running. If the second value of the camshaft misalignment is greater and the first value of the camshaft misalignment is lower than the first threshold value and if the difference between the two values of the camshaft misalignment is greater than the defined second threshold value, a fault in a determination of the irregular running or a fault in an ignition path of the internal combustion engine is identified. The ignition path comprises all of the final controlling elements that contribute towards ignition of an air-fuel mixture in a combustion chamber of the internal combustion engine.

In this connection it may be particularly advantageous if the measured variable associated with the air path is acquired during throttled operation of the internal combustion engine. This may contribute towards a particularly precise determination of the first value of the camshaft misalignment.

According to a further embodiment, the value of the first operating variable represents an actual value of the residual oxygen content of the exhaust gas of the internal combustion engine. A third value of the camshaft misalignment of the camshaft is determined as a function of a value of the irregular running. Trouble-free operation of the internal combustion engine is identified if the three values of the camshaft misalignment are in each case lower than a defined first threshold value. The camshaft misalignment is confirmed if at least one of the three values of the camshaft misalignment is greater than the first threshold value and if a difference between the three values of the camshaft misalignment is lower than a defined second threshold value. A fault in the air path of the internal combustion engine is identified if the first value of the camshaft misalignment is greater and the second and the third value of the camshaft misalignment are lower than the defined first threshold value and if the difference between the three values of the camshaft misalignment is greater than the defined second threshold value. A fault in a fuel path of the internal combustion engine is identified if the second value of the camshaft misalignment is greater and the first and the third value of the camshaft misalignment are lower than the defined first threshold value and if the difference between the three values of the camshaft misalignment is greater than the defined second threshold value. A fault in the determination of the irregular running or a fault in the ignition path of the internal combustion engine is identified if the third value of the camshaft misalignment is greater and the first and the second value of the camshaft misalignment are lower than the defined first threshold value and if the difference between the three values of the camshaft misalignment is greater than the defined second threshold value.

In this connection it can be particularly advantageous if the measured variable associated with the air path is acquired during unthrottled operation of the internal combustion engine. The actual value of the residual oxygen content is determined during throttled operation of the internal combustion engine. This may easily contribute towards a particularly precise determination of the values of the camshaft misalignment.

An internal combustion engine (FIG. 1) comprises an intake tract 1, an engine block 2, a cylinder head 3 and an exhaust tract 4. The intake tract 1 preferentially comprises a throttle valve 5, a collector 6 and an intake manifold 7 that extends in the direction of a cylinder Z1 through an inlet channel into a combustion chamber 9 of the engine block 2. The engine block 2 comprises a crankshaft 8, which is coupled by a connecting rod 10 to the piston 11 of the cylinder Z1. Besides the cylinder Z1, the internal combustion engine preferably comprises further cylinders Z2, Z3, Z4. The internal combustion engine may however also comprise any desired larger number of cylinders. The internal combustion engine is disposed preferably in a motor vehicle.

In the cylinder head 3 an injection valve 18 and a spark plug 19 are preferably disposed. Alternatively, the injection valve 18 may also be disposed in the intake manifold 7. In the exhaust tract 4 an exhaust-gas catalytic converter 21 is preferably disposed, which preferably takes the form of a three-way catalytic converter.

Figure 2:
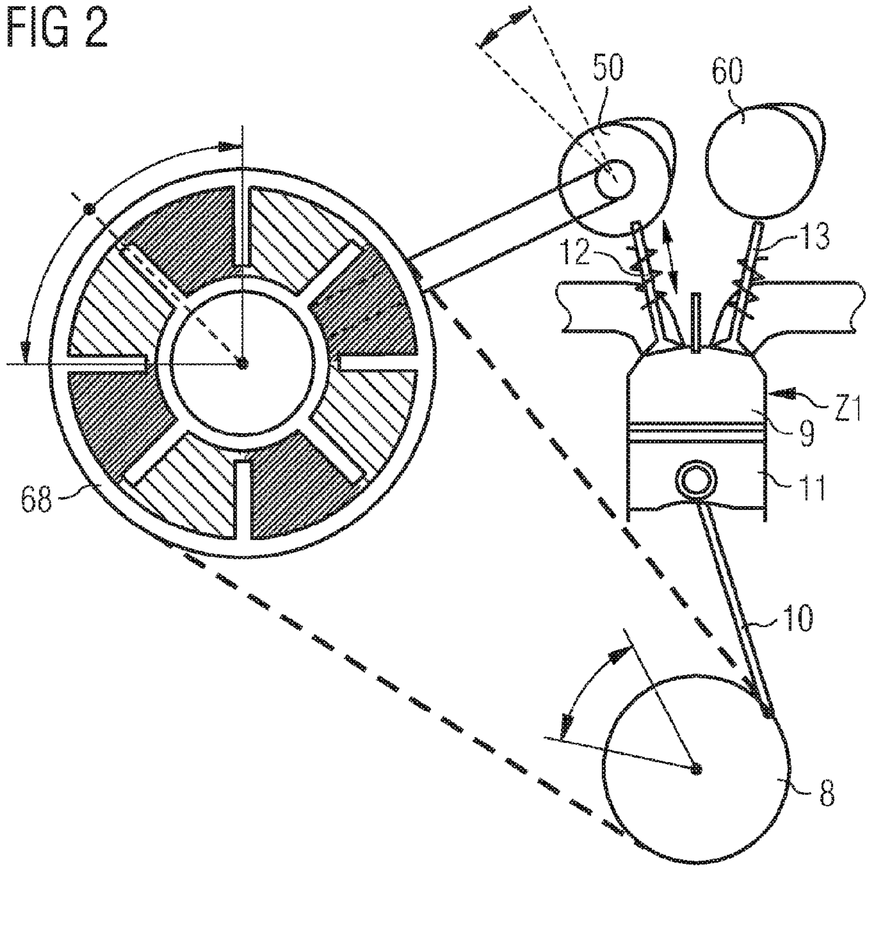
FIG. 2 a further view of the internal combustion engine.

A phase-adjusting device 62 (FIG. 2) is coupled to the crankshaft 8 and an intake camshaft 50. The intake camshaft 50 is coupled to a gas inlet valve 12. The intake camshaft 50 is driven via the phase-adjusting device 62 by the crankshaft 8. The phase-adjusting device 68 enables an adjustment of a phase of the intake camshaft 50 relative to the crankshaft 8. This means that by means of the phase-adjusting device 68 a phase angle between a reference mark on the intake camshaft 50 and a reference mark on the crankshaft 8 may be adjusted in a reference position of the crankshaft 8. An exhaust camshaft 60, which is coupled to a gas outlet valve 13, may additionally be coupled to the phase-adjusting device 68, by means of which a phase of the exhaust camshaft 60 is then adjustable relative to the crankshaft 8.

A control device 25 is provided, associated with which are sensors that acquire various measured variables and determine in each case the measured value of the measured variable. Operating variables of the internal combustion engine comprise the measured variables and variables derived from the measured variables. The control device 25 in dependence upon at least one of the measured variables determines manipulated variables that are then converted into one or more actuating signals for controlling the final controlling elements by means of corresponding adjustment drives. The control device 25 may also be referred to as a device for operating the internal combustion engine.

The sensors are for example a pedal position sensor 26 that acquires an accelerator pedal position of an accelerator pedal 27, an air-mass sensor 28 that acquires an air-mass flow upstream of the throttle valve 5, a throttle-valve position sensor 30 that acquires an opening angle or throttle valve 5, a temperature sensor 32 that acquires an intake-air temperature, an intake-manifold pressure sensor 34 that acquires an intake-manifold pressure in the collector 6, a crankshaft angle sensor 36 that acquires a crankshaft angle, with which a speed of the internal combustion engine is then associated. An exhaust-gas sensor 42 is further provided, which is disposed upstream of the exhaust-gas catalytic converter 21 and acquires for example a residual oxygen content of the exhaust gas and the measuring signal of which is representative of an air-fuel ratio in the combustion chamber 9 of the cylinder Z1.

According to a further embodiment, any desired subset of the described sensors may be provided or additional sensors may also be provided.

The final controlling elements are for example the throttle valve 5, the gas inlet- and gas outlet valves 12, 13, the injection valve 18, the phase-adjusting device 68 and/or the spark plug 19.

Figure 3:
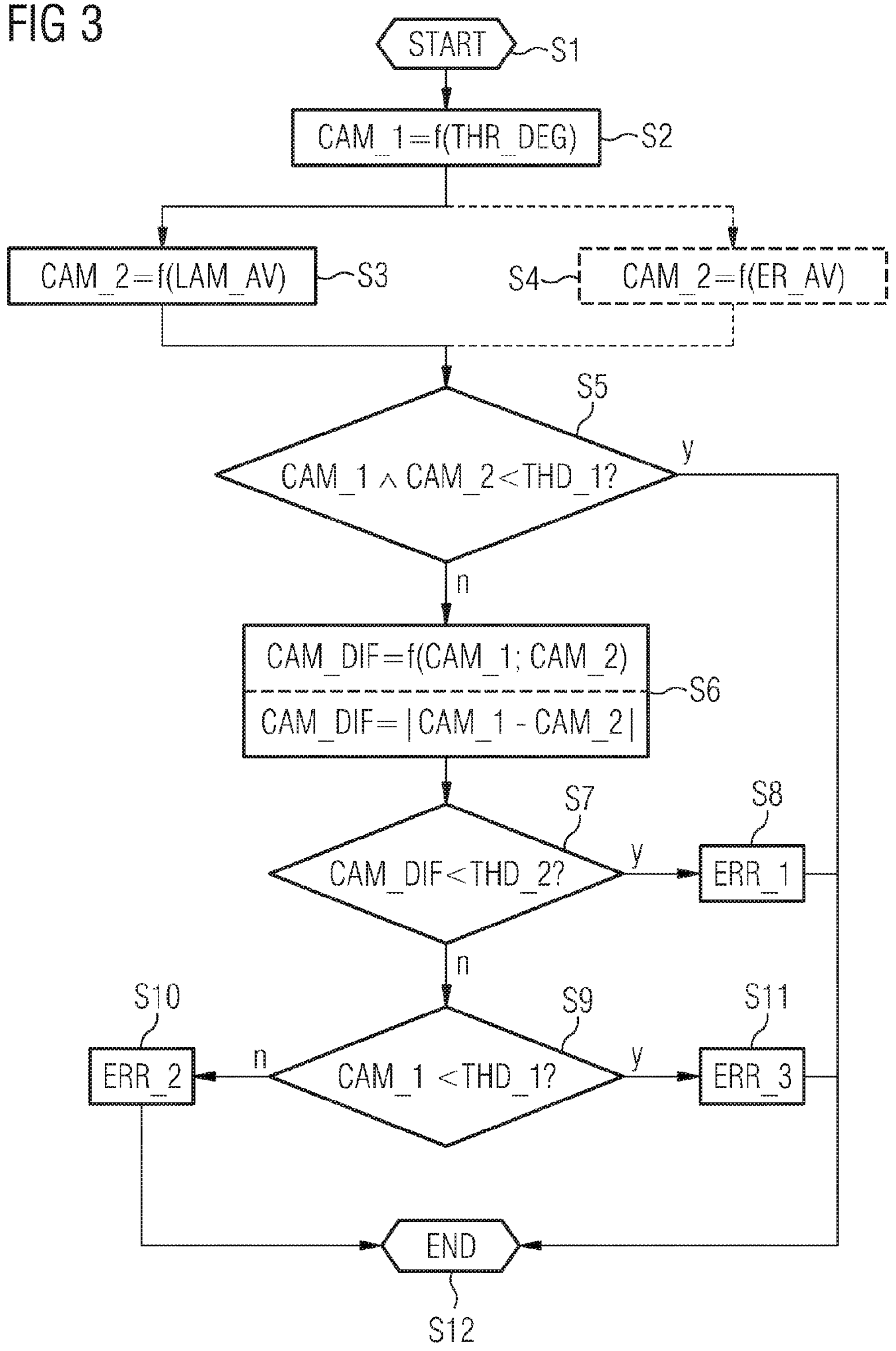
FIG. 3 a flowchart of a first program for operating the internal combustion engine, FIG. 4 a flowchart of a second program for operating the internal combustion engine.

On a storage medium of the control device 25 preferably a first program for operating the internal engine is stored (FIG. 3). The first program enables identification of a fault in an air path, a fuel path, an ignition path or in a determination of the irregular running.

The first program is preferably started in a step S1, for example at a time close to an engine start of the internal combustion engine. In the step S1 optionally variables are initialized.

In a step S2 a first value CAM_1 of a camshaft misalignment of one camshaft of the two camshafts of the internal combustion engine is determined. The first value CAM_1 of the camshaft misalignment is determined as a function of a measured variable that is associated with the air path of the internal combustion engine, for example in accordance with a method that is disclosed in DE 103 32 608 B3. The air path comprises the intake tract 1, the final controlling elements and sensors in the intake tract 1, and characteristic maps and models, on the basis of which as a function of measured variables of the intake tract 1 further operating variables of the intake tract 1 are determined. The measured variable associated with the air path is for example an opening angle THR_DEG of the throttle valve 5. The first value CAM_1 of the camshaft misalignment is then determined preferably on the basis of an intake manifold model that is preferably stored on the storage medium of the control device 25.

In a step S3 a second value CAM_2 of the camshaft misalignment of the camshaft is determined as a function of a value of a first operating variable of the internal combustion engine outside of the air path. For example, the second value CAM_2 of the camshaft misalignment is determined on the basis of a measured variable of the fuel path of the internal combustion engine, in particular as a function of an actual value LAM_AV of a residual oxygen content of an exhaust gas of the internal combustion engine, for example in accordance with a method that is disclosed in DE 10 2004 039 216 A1. The actual value LAM_AV of the residual oxygen content of the internal combustion engine is preferably acquired by means of the exhaust-gas sensor 42. The fuel path comprises the exhaust tract 4, all of the final controlling elements and sensors in the exhaust tract, and characteristic maps and models, on the basis of which as a function of measured variables of the exhaust tract 4 further operating variables of the exhaust tract 4 are determined.

As an alternative to the step S3, a step S4 may be executed, in which the second value CAM_2 of the camshaft misalignment is determined as a function of a measured variable of an ignition path or as a function of a measured variable that contributes towards the determination of an irregular running, for example in accordance with a method that is disclosed in DE 198 59 018 A1. In particular, the second value CAM_2 of the camshaft misalignment may be determined in the step S4 as a function of an actual value ER_AV of the irregular running. The ignition path comprises all of the final controlling elements that contribute towards the ignition of an air-fuel mixture in the combustion chamber 9.

In a step S5 it is checked whether the first and the second value CAM_1, CAM_2 of the camshaft misalignment are in each case lower than a first threshold value THD_1. If the condition of the step S5 is met, then trouble-free operation of the internal combustion engine is identified and the first program may be terminated in a step S12. If the condition of the step S5 is not met, then processing is continued in a step S6.

In the step S6 a difference CAM_DIF between the two values of the camshaft misalignment is determined, preferably in accordance with the calculation specification indicated in the step S6.

In a step S7 it is checked whether the difference CAM_DIF is lower than a defined second threshold value THD_2. If the condition of the step S7 is met, processing is continued in a step S8. If the condition of the step S7 is not met, processing is continued in a step S9.

In the step S8 a first error message ERR_1 is generated. The first error message ERR_1 is representative of the actual presence of a camshaft misalignment. The first error message ERR_1 may for example bring about an adaptation of the camshaft misalignment. Alternatively or additionally the first error message ERR_1 may bring about a safety measure, for example a limiting of a torque of the internal combustion engine and/or an entry in an error memory of the internal combustion engine.

In the step S9 it is checked whether the first value CAM_1 of the camshaft misalignment is lower than the defined first threshold value THD_1. If the condition of the step S9 is met, processing is continued in a step S11. If the condition of the step S9 is not met, processing is continued in a step S10.

In the step S10 a second error message ERR_2 is generated, which is representative of the first value CAM_1 of the camshaft misalignment having been determined as faulty. As the first value CAM_1 of the camshaft misalignment was determined on the basis of a measured variable, a final controlling element or a sensor of the air path, this is representative of a fault in the air path of the internal combustion engine. Alternatively or additionally the second error message ERR_2 may bring about a safety measure, for example a limiting of a torque of the internal combustion engine and/or an entry in an error memory of the internal combustion engine.

In the step S11 a third error message ERR_3 is generated, which is representative of the second value CAM_2 of the camshaft misalignment having been determined as faulty. If in the first program the step S3 was executed, then the third error message ERR_3 is therefore representative of the presence of a fault in the fuel path of the internal combustion engine. If, instead of the step S3, the step S4 was executed, then the third error message ERR_3 is representative of the presence of a fault in the ignition path or in the determination of the irregular running. Alternatively or additionally the third error message ERR_3 may bring about a safety measure, for example a limiting of a torque of the internal combustion engine and/or an entry in an error memory of the internal combustion engine.

In a step S12 the first program may be terminated. Preferably, however, the first program is executed regularly during operation of the internal combustion engine.

Figure 4:
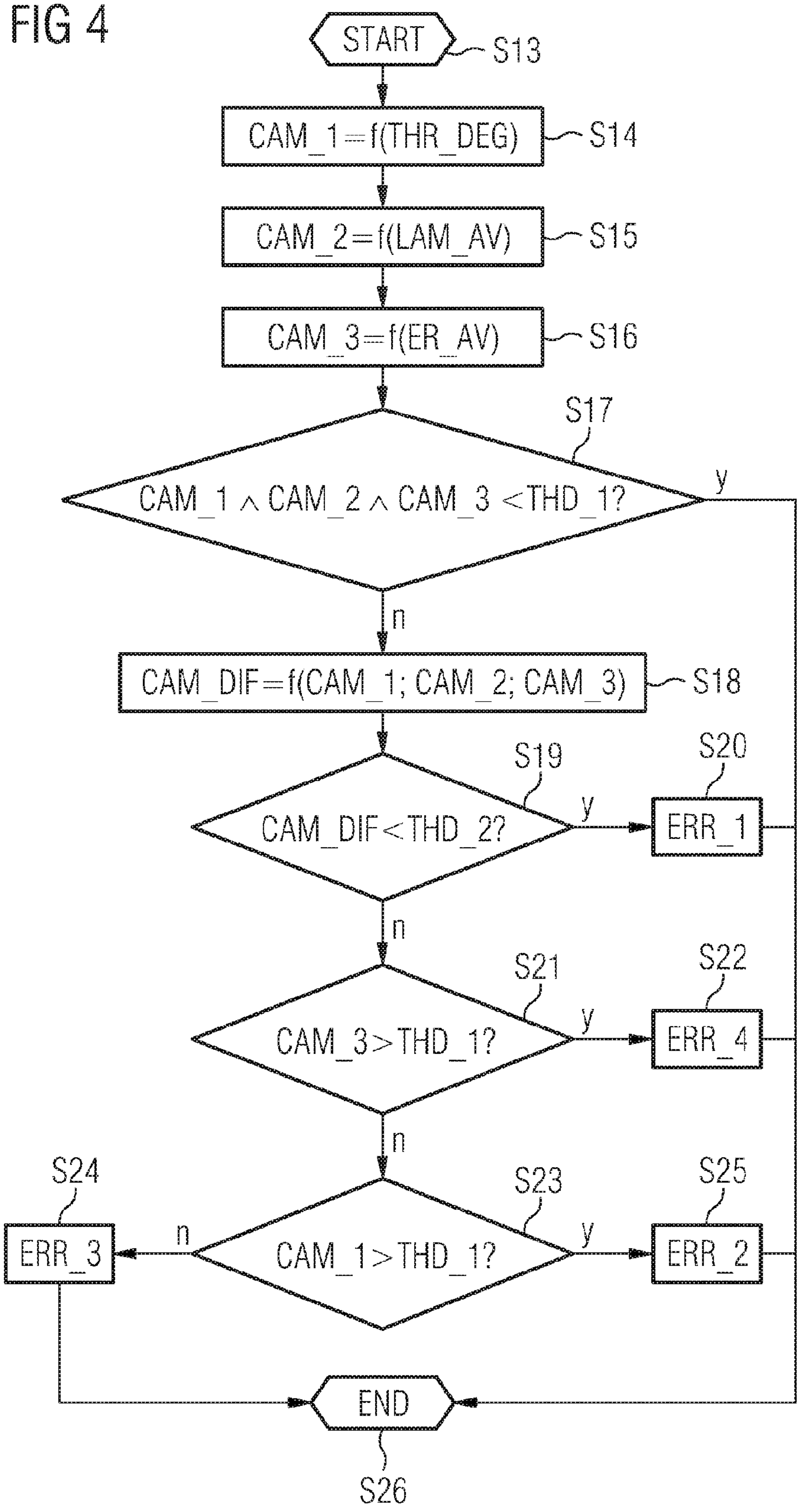

Alternatively or additionally a second program for operating the internal combustion engine may be stored on the storage medium of the control device 25 (FIG. 4). The second program is used to identify a fault in the air path, in the fuel path, in the ignition path or in the determination of the irregular running as a function of values of the camshaft misalignment.

The second program is started preferably in a step S13 at a time close to an engine start of the internal combustion engine. In the step S13 optionally variables are initialized.

In a step S14 the first value CAM_1 of the camshaft misalignment is determined as a function of a measured variable of the air path, for example the opening angle THR_DEG of the throttle valve 5.

In a step S15 the second value CAM_2 of the camshaft misalignment is determined by means of the fuel path, for example as a function of the actual value LAM_AV of the residual oxygen content of the exhaust gas of the internal combustion engine.

In a step S16 a third value CAM_3 of the camshaft misalignment is determined as a function of the actual value of the irregular running ER_RV.

In a step S17 it is checked whether all of the determined values of the camshaft misalignment are in each case lower than the first threshold value THD_1. If the condition of the step S17 is met, trouble-free operation of the internal combustion is identified and the second program may be terminated in a step S26. If the condition of the step S17 is not met, processing is continued in a step S18.

In a step S18 the difference CAM_DIF of the camshaft misalignment is determined as a function of all of the determined values of the camshaft misalignment. This may be determined for example by mean-value generation and/or by determining a standard deviation of the camshaft misalignment. Alternatively, the difference CAM_DIF between each two of the values of the camshaft misalignment may be determined in each case individually.

In a step S19 it is checked whether the determined difference or differences CAM_DIF of the camshaft misalignment are in each case lower than a defined second threshold value THD_2. If the condition of the step S19 is met, processing is continued in a step S20. If the condition of the step 19 is not met, processing is continued in a step S21.

In the step S20 the first error message ERR_1 is generated in accordance with the step S8 of the first program.

In the step S21 it is checked whether exclusively the third value CAM_3 of the camshaft misalignment is greater than the first threshold value THD_1. If the condition of the step S21 is met, processing is continued in a step S22. If the condition of the step S21 is not met, processing is continued in a step S23.

In the step S22 a fourth error message ERR_4 is generated. The fourth error message ERR_4 is representative of the third value CAM_3 of the camshaft misalignment having been determined as faulty and hence of the presence of a fault in the determination of the irregular running or a fault in the ignition path of the internal combustion engine.

In the step S23 it is checked whether exclusively the first value CAM_1 of the camshaft misalignment is greater than the first threshold value THD_1. If the condition of the step S23 is met, processing is continued in a step S25. If the condition of the step S23 is not met, processing is continued in a step S42.

In the step S25 the second error message ERR_2 is generated.

In the step S24 the third error message is generated, which in this connection is merely representative of the fault in the fuel path.

In the step S26 the second program may be terminated. Preferably, however, the second program is executed afresh regularly during operation of the internal combustion engine.

What is claimed is:

1. A method of operating an internal combustion engine, comprising determining a first value of a camshaft misalignment of a camshaft of the internal combustion engine as a function of a measured variable, wherein the measured variable is associated with an air path of the internal combustion engine, determining a second value of the camshaft misalignment of the camshaft as a function of a value of a first operating variable of the internal combustion engine outside of the air path, identifying trouble-free operation of the internal combustion engine if both values of the camshaft misalignment are lower than a defined first threshold value, confirming the camshaft misalignment if at least one of the two values of the camshaft misalignment is greater than the defined first threshold value and if a difference between the two values of the camshaft misalignment is lower than a defined second threshold value, identifying a fault in the air path of the internal combustion engine if the first value of the camshaft misalignment is greater and the second value of the camshaft misalignment is lower than the defined first threshold value and if the difference between the two values of the camshaft misalignment is greater than the defined second threshold value, and identifying a fault outside of the air path of the internal combustion engine if the second value of the camshaft misalignment is greater and the first value of the camshaft misalignment is lower than the defined first threshold value and if the difference between the two values of the camshaft misalignment is greater than the defined second threshold value.

2. The method according to claim 1, wherein the value of the first operating variable represents an actual value of a residual oxygen content of an exhaust gas of the internal combustion engine, if the second value of the camshaft misalignment is greater and the first value of the camshaft misalignment is lower than the first threshold value and if the difference between the two values of the camshaft misalignment is greater than the defined second threshold value, a fault in the fuel path of the internal combustion engine is identified.

3. The method according to claim 2, wherein the measured variable is acquired during throttled operation of the internal combustion engine, the actual value of the residual oxygen content is determined during unthrottled operation of the internal combustion engine.

4. The method according to claim 1, wherein the value of the first operating variable represents a value of an irregular running, if the second value of the camshaft misalignment is greater and the first value of the camshaft misalignment is lower than the first threshold value and if the difference between the two values of the camshaft misalignment is greater than the defined second threshold value a fault in a determination of the irregular running or a fault in an ignition path of the internal combustion engine is identified.

5. The method according to claim 4, wherein the measured variable is acquired during throttled operation of the internal combustion engine.

6. The method according to claim 1, wherein the value of the first operating variable represents an actual value of a residual oxygen content of an exhaust gas of the internal combustion engine, a third value of the camshaft misalignment of the camshaft is determined as a function of a value of an irregular running, trouble-free operation of the internal combustion engine is identified if the three values of the camshaft misalignment are in each case lower than the defined first threshold value, the camshaft misalignment is confirmed if at least one of the values of the camshaft misalignment is greater than the first threshold value and if a difference between the three values of the camshaft misalignment is lower than a defined second threshold value, a fault in the air path of the internal combustion engine is identified if the first value of the camshaft misalignment is greater and the second and the third value of the camshaft misalignment are lower than the defined first threshold value and if the difference between the three values of the camshaft misalignment is greater than the defined second threshold value, a fault in a fuel path of the internal combustion engine is identified if the second value of the camshaft misalignment is greater and the first and the third value of the camshaft misalignment are lower than the defined first threshold value and if the difference between the three values of the camshaft misalignment is greater than the defined second threshold value, a fault in a determination of the irregular running or a fault in an ignition path of the internal combustion engine is identified if the third value of the camshaft misalignment is greater and the first and the second value of the camshaft misalignment are lower than the defined first threshold value and if the difference between the three values of the camshaft misalignment is greater than the defined second threshold value.

7. The method according to claim 6, wherein the measured variable is acquired during unthrottled operation of the internal combustion engine, the actual value of the residual oxygen content is determined during throttled operation of the internal combustion engine.

8. A device for operating an internal combustion engine, wherein the device is operable to determine a first value of a camshaft misalignment of a camshaft of the internal combustion engine as a function of a measured variable, wherein the measured variable is associated with an air path of the internal combustion engine, to determine a second value of the camshaft misalignment of the camshaft as a function of a value of a first operating variable of the internal combustion engine outside of the air path, to identify trouble-free operation of the internal combustion engine if both values of the camshaft misalignment are lower than a defined first threshold value, to confirm the camshaft misalignment if at least one of the two values of the camshaft misalignment is greater than the first threshold value and if a difference between the two values of the camshaft misalignment is lower than a defined second threshold value, to identify a fault in the air path of the internal combustion engine if the first value of the camshaft misalignment is greater and the second value of the camshaft misalignment is lower than the defined first threshold value and if the difference between the two values of the camshaft misalignment is greater than the defined second threshold value, to identify a fault outside of the air path of the internal combustion engine if the second value of the camshaft misalignment is greater and the first value of the camshaft misalignment is lower than the defined first threshold value and if the difference between the two values of the camshaft misalignment is greater than the defined second threshold value.

9. A device for operating an internal combustion engine, comprising sensors that acquire various measured variables and determine in each case the measured value of the measured variable, wherein the control device in dependence upon at least one of the measured variables is operable to determine manipulated variables that are then converted into one or more actuating signals for controlling final controlling elements by means of corresponding adjustment drives, wherein the device is operable to determine a first value of a camshaft misalignment of a camshaft of the internal combustion engine as a function of one of the measured variable, wherein the one of the measured variable is associated with an air path of the internal combustion engine, to determine a second value of the camshaft misalignment of the camshaft as a function of a value of a first operating variable of the internal combustion engine outside of the air path, to identify trouble-free operation of the internal combustion engine if both values of the camshaft misalignment are lower than a defined first threshold value, to confirm the camshaft misalignment if at least one of the two values of the camshaft misalignment is greater than the first threshold value and if a difference between the two values of the camshaft misalignment is lower than a defined second threshold value, to identify a fault in the air path of the internal combustion engine if the first value of the camshaft misalignment is greater and the second value of the camshaft misalignment is lower than the defined first threshold value and if the difference between the two values of the camshaft misalignment is greater than the defined second threshold value, to identify a fault outside of the air path of the internal combustion engine if the second value of the camshaft misalignment is greater and the first value of the camshaft misalignment is lower than the defined first threshold value and if the difference between the two values of the camshaft misalignment is greater than the defined second threshold value.

10. The device according to claim 9, wherein the sensors comprise at least one of: a pedal position sensor that acquires an accelerator pedal position of an accelerator pedal, an air-mass sensor that acquires an air-mass flow upstream of a throttle valve, a throttle-valve position sensor that acquires an opening angle or throttle valve, a temperature sensor that acquires an intake-air temperature, an intake-manifold pressure sensor that acquires an intake-manifold pressure in the collector, and a crankshaft angle sensor that acquires a crankshaft angle, with which a speed of the internal combustion engine is then associated.

11. The device according to claim 10, wherein the sensors further comprise: an exhaust-gas sensor which is disposed upstream of the exhaust-gas catalytic converter and acquires a residual oxygen content of the exhaust gas and the measuring signal of which is representative of an air-fuel ratio in the combustion chamber of the cylinder.

12. The device according to claim 9, wherein the final controlling elements comprise at least one of: a throttle valve, a gas inlet- and a gas outlet valve, an injection valve, a phase-adjusting device and a spark plug.

13. The device according to claim 9, wherein the value of the first operating variable represents an actual value of a residual oxygen content of an exhaust gas of the internal combustion engine, if the second value of the camshaft misalignment is greater and the first value of the camshaft misalignment is lower than the first threshold value and if the difference between the two values of the camshaft misalignment is greater than the defined second threshold value, the device is operable to identify a fault in the fuel path of the internal combustion engine.

14. The device according to claim 13, wherein the device is configured to acquire the measured variable during throttled operation of the internal combustion engine, and to determine the actual value of the residual oxygen content during unthrottled operation of the internal combustion engine.

15. The device according to claim 9, wherein the value of the first operating variable represents a value of an irregular running, if the second value of the camshaft misalignment is greater and the first value of the camshaft misalignment is lower than the first threshold value and if the difference between the two values of the camshaft misalignment is greater than the defined second threshold value, the device is operable to identify a fault in a determination of the irregular running or a fault in an ignition path of the internal combustion engine.

16. The device according to claim 15, wherein the device is configured to acquire the measured variable during throttled operation of the internal combustion engine.

17. The device according to claim 9, wherein the value of the first operating variable represents an actual value of a residual oxygen content of an exhaust gas of the internal combustion engine, the device is configured to determine a third value of the camshaft misalignment of the camshaft as a function of a value of an irregular running, the device is configured to identify trouble-free operation of the internal combustion engine if the three values of the camshaft misalignment are in each case lower than the defined first threshold value, the device is configured to confirm the camshaft misalignment if at least one of the values of the camshaft misalignment is greater than the first threshold value and if a difference between the three values of the camshaft misalignment is lower than a defined second threshold value, the device is configured to identify a fault in the air path of the internal combustion engine if the first value of the camshaft misalignment is greater and the second and the third value of the camshaft misalignment are lower than the defined first threshold value and if the difference between the three values of the camshaft misalignment is greater than the defined second threshold value, the device is configured to identify a fault in a fuel path of the internal combustion engine if the second value of the camshaft misalignment is greater and the first and the third value of the camshaft misalignment are lower than the defined first threshold value and if the difference between the three values of the camshaft misalignment is greater than the defined second threshold value, and the device is configured to identify a fault in a determination of the irregular running or a fault in an ignition path of the internal combustion engine if the third value of the camshaft misalignment is greater and the first and the second value of the camshaft misalignment are lower than the defined first threshold value and if the difference between the three values of the camshaft misalignment is greater than the defined second threshold value.

18. The device according to claim 17, wherein the device is configured to acquire the measured variable during unthrottled operation of the internal combustion engine, and the device is configured to determine the actual value of the residual oxygen content during throttled operation of the internal combustion engine.

* * * * *